(12) United States Patent
Veltrop et al.

(10) Patent No.: US 9,340,315 B2
(45) Date of Patent: *May 17, 2016

(54) MULTI-LEVEL COMPARTMENTALIZED INSERT FOR A FOOD HOLDING CABINET HAVING AT LEAST ONE INDEPENDENT SLIDING COMPARTMENTALIZED TRAY AND COVER FOR SAME

(71) Applicant: PRINCE CASTLE LLC, Carol Stream, IL (US)

(72) Inventors: Loren Veltrop, Chicago, IL (US); Mary Morgan, New York, NY (US)

(73) Assignee: PRINCE CASTLE LLC, Carol Stream, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/557,366

(22) Filed: Dec. 1, 2014

(65) Prior Publication Data

US 2015/0083636 A1 Mar. 26, 2015

Related U.S. Application Data

(63) Continuation of application No. 14/154,482, filed on Jan. 14, 2014, now Pat. No. 8,899,421.

(60) Provisional application No. 61/753,030, filed on Jan. 16, 2013.

(51) Int. Cl.
| | |
|---|---|
| *B65D 83/00* | (2006.01) |
| *B65D 1/34* | (2006.01) |
| *B65D 1/36* | (2006.01) |
| *A47F 10/06* | (2006.01) |
| *A47J 39/02* | (2006.01) |

(Continued)

(52) U.S. Cl.
CPC . *B65D 1/36* (2013.01); *A47F 10/06* (2013.01); *A47G 23/04* (2013.01); *A47J 39/02* (2013.01); *A47J 47/08* (2013.01); *A47J 47/14* (2013.01); *B65D 83/0005* (2013.01); *A47G 23/06* (2013.01)

(58) Field of Classification Search
USPC ............... 206/557, 558, 561, 564, 223, 541; 220/4.26, 4.27, 23.83, 23.87; 99/448; 219/392
See application file for complete search history.

(56) References Cited

U.S. PATENT DOCUMENTS

| | | |
|---|---|---|
| 4,096,734 A | 6/1978 | Khayat |
| 4,112,916 A | 9/1978 | Guibert |

(Continued)

OTHER PUBLICATIONS

Alpha M.O.S. America, Inc., Flavor & Odor Analyzers, company product development and quality control data sheet.

(Continued)

*Primary Examiner* — Jacob K Ackun
(74) *Attorney, Agent, or Firm* — Marshall, Gerstein & Borun LLP (57) ABSTRACT

An insert for a food holding cabinet provides multiple, individual food holding compartments, which can be operated as encapsulated environments. The insert is made from an elongated tray formed to have at least one food product holding compartment, which is formed at one end of the elongated tray. A slid-able is configured to be able slide back and forth and formed to have at least one additional food product holding compartment. A slid-able cover is configured to be able to slide in the elongated tray, over the slide-able cover. Multiple individual food holding compartments can be uncovered, one-at-a-time as need for food product arises.

14 Claims, 10 Drawing Sheets (51) Int. Cl.
*A47J 47/08* (2006.01)
*A47J 47/14* (2006.01)
*A47G 23/04* (2006.01)
*A47G 23/06* (2006.01)

(56) References Cited

U.S. PATENT DOCUMENTS

| | | | |
|---|---|---|---|
| 4,153,160 | A | 5/1979 | Leigh |
| 4,736,850 | A | 4/1988 | Bowman et al. |
| 5,724,886 | A | 3/1998 | Ewald et al. |
| 2004/0074399 | A1 | 4/2004 | Zhou et al. |
| 2010/0129502 | A1 | 5/2010 | Feinberg et al. |
| 2012/0085745 | A1 | 4/2012 | Brattoli |

OTHER PUBLICATIONS

USPTO, Office Action for U.S. Appl. No. 13/326,607 issued Apr. 11, 2013.
USPTO, Office Action for U.S. Appl. No. 13/326,607 issued Sep. 12, 2013.
USPTO, Office Action for U.S. Appl. No. 13/326,607 issued Feb. 25, 2014.
USPTO, Office Action for U.S. Appl. No. 13/326,667 issued May 29, 2013.

MULTI-LEVEL COMPARTMENTALIZED INSERT FOR A FOOD HOLDING CABINET HAVING AT LEAST ONE INDEPENDENT SLIDING COMPARTMENTALIZED TRAY AND COVER FOR SAME

The content of the Applicant's co-pending patent application Ser. No. 13/326,667 filed on Dec. 15, 2011, titled, "Apparatus for Preserving Cooked Food Palatability," is incorporated herein by reference in its entirety. The content of the Applicant's co-pending patent application Ser. No. 13/326,607 filed Dec. 15, 2011, titled, "Method of Extending the Time During Which Pre-Cooked Foods Are Kept Palatable," is also incorporated herein by reference in its entirety.

BACKGROUND

Many fast-food restaurants prepare food items before they are actually ordered and keep them warm until they are ordered by a customer. A pre-cooked, i.e. a pre-prepared, food product can thus be sold and served to the customer in significantly less time than it takes to prepare each food item after it is ordered.

A problem with pre-cooked foods is that they lose their taste or palatability over time. While taste or palatability is subjective, empirical data shows that most people will dislike the taste of a hamburger after it has been "held" or kept in a warming tray for more than about 15 minutes. Fast-food restaurant operators therefore keep pre-cooked foods warm and ready to serve for only a relatively short period of time, typically fifteen to twenty minutes. When that time has elapsed, the pre-cooked food product is disposed of. Extending the holding time of a pre-cooked food product is therefore contrary to the common and accepted practice of fast-food restaurant operators. Nevertheless, a method and apparatus for extending or preserving the palatability of a cooked food product would be an improvement over the prior art.

DETAILED DESCRIPTION

Figure 1:
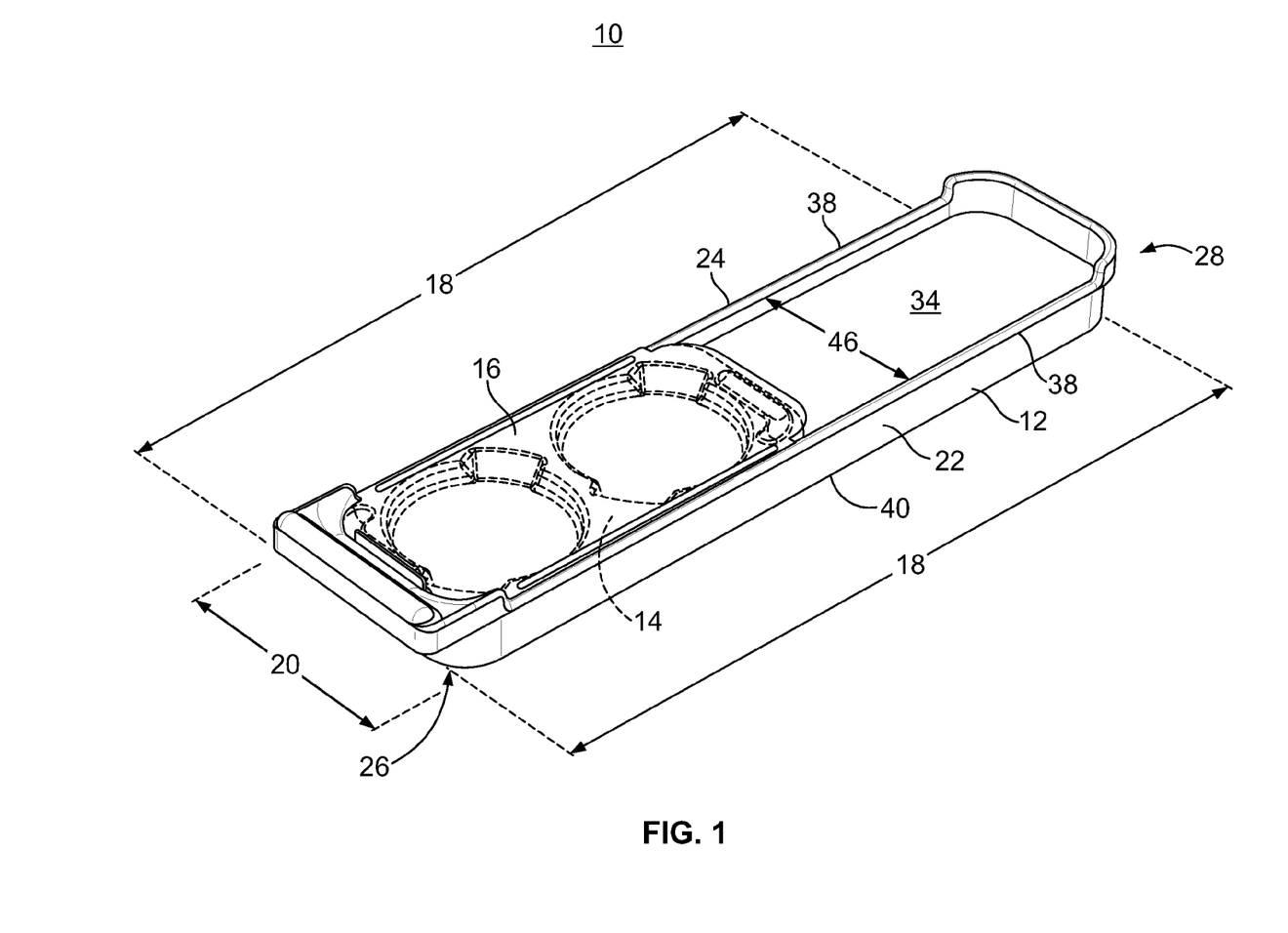
FIG. 1 is a perspective view of a multi-level compartmentalized insert for a food holding cabinet, which has an independently slide-able compartmentalized tray and a cover for the slide-able tray.

FIG. 1 is a perspective view of a compartmentalized insert 10 for a food holding cabinet. The terms, "compartmentalized insert" and "multi-level compartmentalized insert" and "insert" are used interchangeably hereafter.

The insert 10 comprises an elongated and substantially rectangular-shaped tray 12, a slide-able tray 14 that fits inside the elongated tray 12 and, a slide-able cover 16 for the slide-able tray 14. The slide-able cover 16 fits over the slide-able tray 14 and provides a cover for food storage compartments in the slide-able tray 14, which can be opened by sliding the cover 16 forwardly or backwardly relative to the slide-able tray 14.

The elongated tray 12 is so named because it has a length dimension 18 that is much greater than its width dimension 20. It has two elongated, opposing and upright sides 22 and 24. The sides 22, 24 are held in a fixed, spaced-apart relationship to each other by two opposing ends 26, 28, which also form part of the elongated tray 12.

Figure 2A:
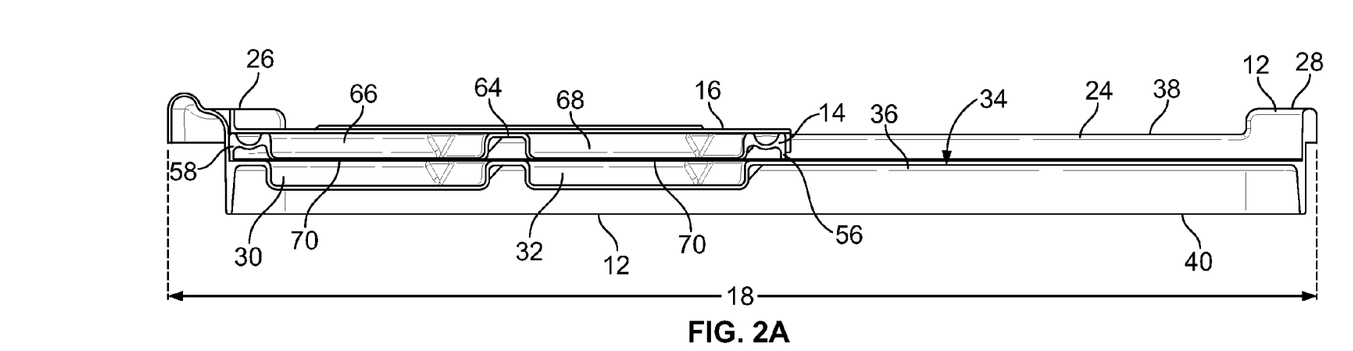
FIG. 2A is a cross-sectional view of the device shown in FIG. 1.
Figure 2B:
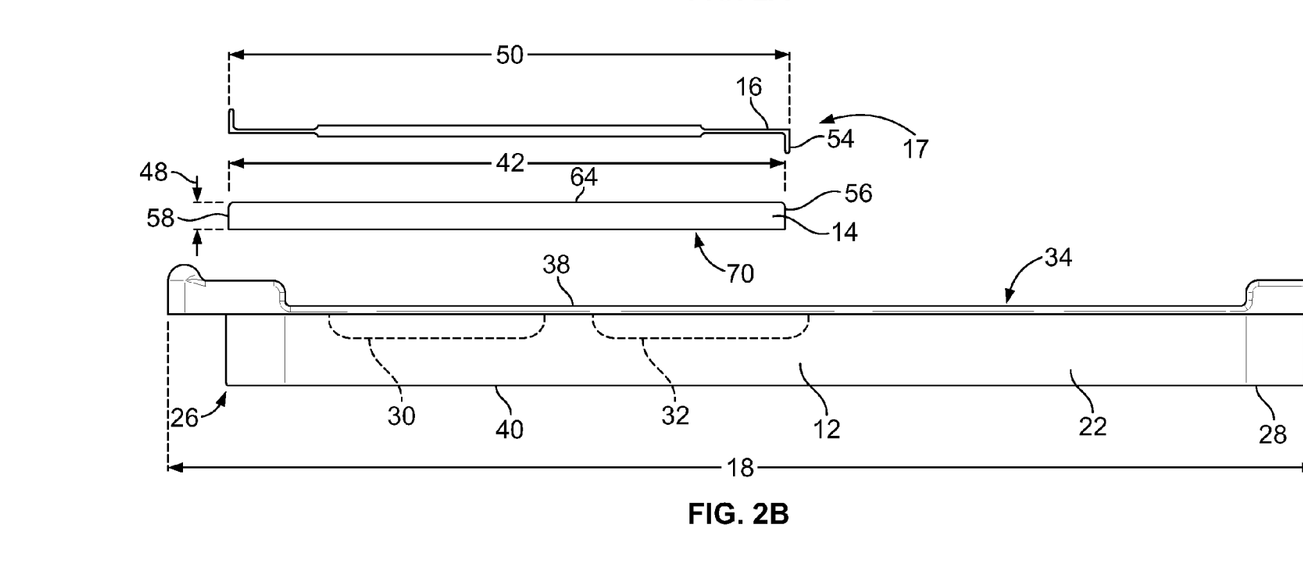
FIG. 2B is an exploded view of the device as shown in FIG. 2A.
Figure 3:
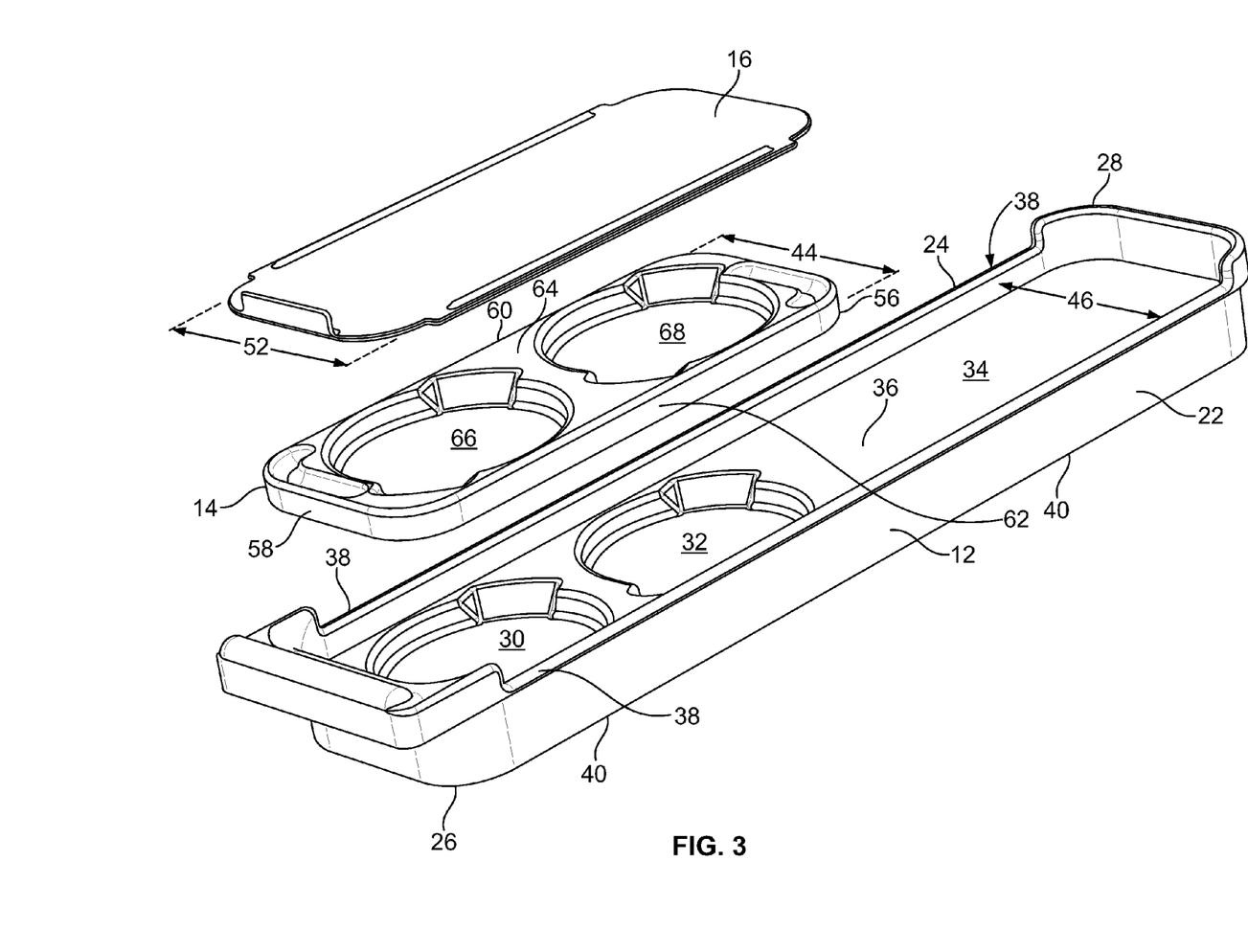
FIG. 3 is an exploded view of the device as shown in FIG. 1.

As best seen in FIGS. 2A, 2B and FIG. 3, the elongated tray 12 is formed to have at least one and preferably two or more food holding compartments 30, 32. The holding compartments 30 and 32 shown in the figures are disc-shaped depressions or voids formed downwardly into a substantially horizontal surface or platform 34, which "extends from" or across the space between the two opposing sides 22 and 24. The top surface 36 of the platform 34 is configured so that it is elevated above the bottom 38 of the elongated tray 12 and above the bottom of each side 22, 24 yet below the top 44 of each side. In a preferred embodiment, the platform 34 and its top surface 26 are thus located at an elevation that is approximately mid-way between the bottom 40 and the top 38 of each side 22 and 24.

The shape of the food product holding compartments 30, 32 is not critical. Compartments can be disc shaped to receive disc-shaped patties. The compartments need not be disc-shaped however but can have other shapes, e.g., square, rectangular, or triangular. Since the compartments are preferably shaped to correspond to a shape of a food product to be kept in a compartments. The shape of a compartment that is shaped to conform to or be "similar" to the shape of a particular food product is thus known in advance. The compartments' shape is thus preferably predetermined, by which is meant, known in advance.

The compartmentalized insert 10 shown in FIG. 1 is also comprised of a slide-able tray 14. The slide-able tray 14 has a length dimension 42, best seen in FIG. 2B, which is selected to be is less than the length dimension 18 of the elongated tray 12. The side-able tray 14 also has a width dimension 44, best seen in FIG. 3, which is just slightly less than the interior width 46 of the elongated tray 12. The slide-able tray 14 has a height dimension 48 that is preferably equal to or slightly less than the distance between the top 36 of the platform 34 and the top edge or top 40 of the sides 22 and 24. The dimensions of the slide-able tray 14 are selected such that the slide-able tray 14 is able to fit within the space between the sidewalls 22 and 24 and ends 26, 28 of the elongated tray 12, and be able to freely slide or translate back and forth inside the elongated tray 12, from one end 26 to the other 28 and back.

Referring now to FIG. 2B, the slide-able cover 16, which fits over the top of the slide-able tray 14, has a length dimension 50, which is substantially equal to the length dimension 42 of the slide-able tray 14 so that the cover 16 can cover at least the food holding compartments that are formed into the slide-able tray 14. The slide-able tray cover 16 has a width dimension 52, best seen in FIG. 3, which is slightly greater than the width dimension 44 of the slide-able tray 14. The cover 16 is preferably made of either a transparent or translucent material.

Importantly, the rear or second end 17 of the slide-able cover 16 is provided with a downwardly-extending lip or clip 54 having a downwardly-extending length that is less than the thickness 48 of the slide-able tray 14 but nevertheless long enough to ensure that the clip 54 grasps the rear or first end 56 of the slide-able tray 14 when the cover 16 is pulled or pushed forwardly, i.e., toward the first end 26 of the elongated tray 12.

Referring again to FIG. 3, the slide-able tray 14 has two upright and opposing sidewalls 60 and 62, which are held upright and in a spaced apart relationship to each other by two opposing ends 56 and 58, which form part of the slide-able tray 14. The slide-able tray 14 is formed to have a planar top surface 64 into which two disc-shaped depressions 66, 68 are formed and which comprised food holding compartments 66 and 68. The shape of the food holding compartments 66, 68 in the slide-able tray 14 are preferably identical or nearly identical to the shape of the food holding compartments 30, 32 formed into the elongated tray 12. As described below, the insert 10 is thus able to provide "encapsulated environments" for several pre-cooked food products, typically hamburger patties.

As with the food holding compartments 30, 32 formed in the elongated tray 12, the food holding compartments 66, 68 formed into the slide-able tray 14 are essentially disc-shaped depressions because it is known in advance that the compartments 66, 68 will receive disc-shaped patties and the like. The shapes of the food holding compartments 66, 68 are thus considered herein to be predetermined.

As best seen in FIG. 2B and FIG. 3, the slide-able tray 14 has a length dimension 42 and a width dimension 44 and a thickness or height 48 selected to allow the slide-able tray to fit between the opposing sides 22 and 24 of the tray 12, rest on the top surface 36 of the platform surface 26, not be higher than the tops of the side walls 22, 24 of the elongated tray 12 yet freely translate back and forth in the elongated tray 12, between the opposing ends 26 and 28 of the elongated tray 12. The slide-able tray 14 can be pulled forwardly, i.e., toward the first end 26 by pulling the cover 16 forwardly by virtue of the lip or clip 54 that extends downwardly from the rear end 17 of the cover 16. See FIG. 2B.

The food holding compartments 30, 32 formed into the elongated tray 14 are fixed in the elongated tray 12 and close to or "proximate" to one end 26 of the elongated tray 12. As best seen in FIG. 2A and 2B, the slide-able tray 14 has a bottom 70, which is substantially planar and which will cover and uncover the first and second holding compartments 30 and 32 when the tray 14 is slid toward and away from the front end 26 of the elongated tray 12. When the slide-able tray 14 is in its forward position, i.e., at the front end 26, the bottom 70 of the slide-able tray 14 completely covers both compartments 30 and 32, thereby transforming or converting the otherwise open compartments 30 and 32 into "encapsulated environments."

An "encapsulated environment" is defined in the applicant's co-pending patent application Ser. No. 13/326,667 filed Dec. 15, 2011 entitled "Apparatus For Preserving Cooked Food Palatability." See also the applicant's co-pending application Ser. No. 13/326,607 filed Dec. 15, 2011 entitled "Method of Extending the Time During Which Pre-Cooked Foods Are Kept Palatable." The contents of both applications are hereby incorporated by reference in the entireties.

Figure 4:
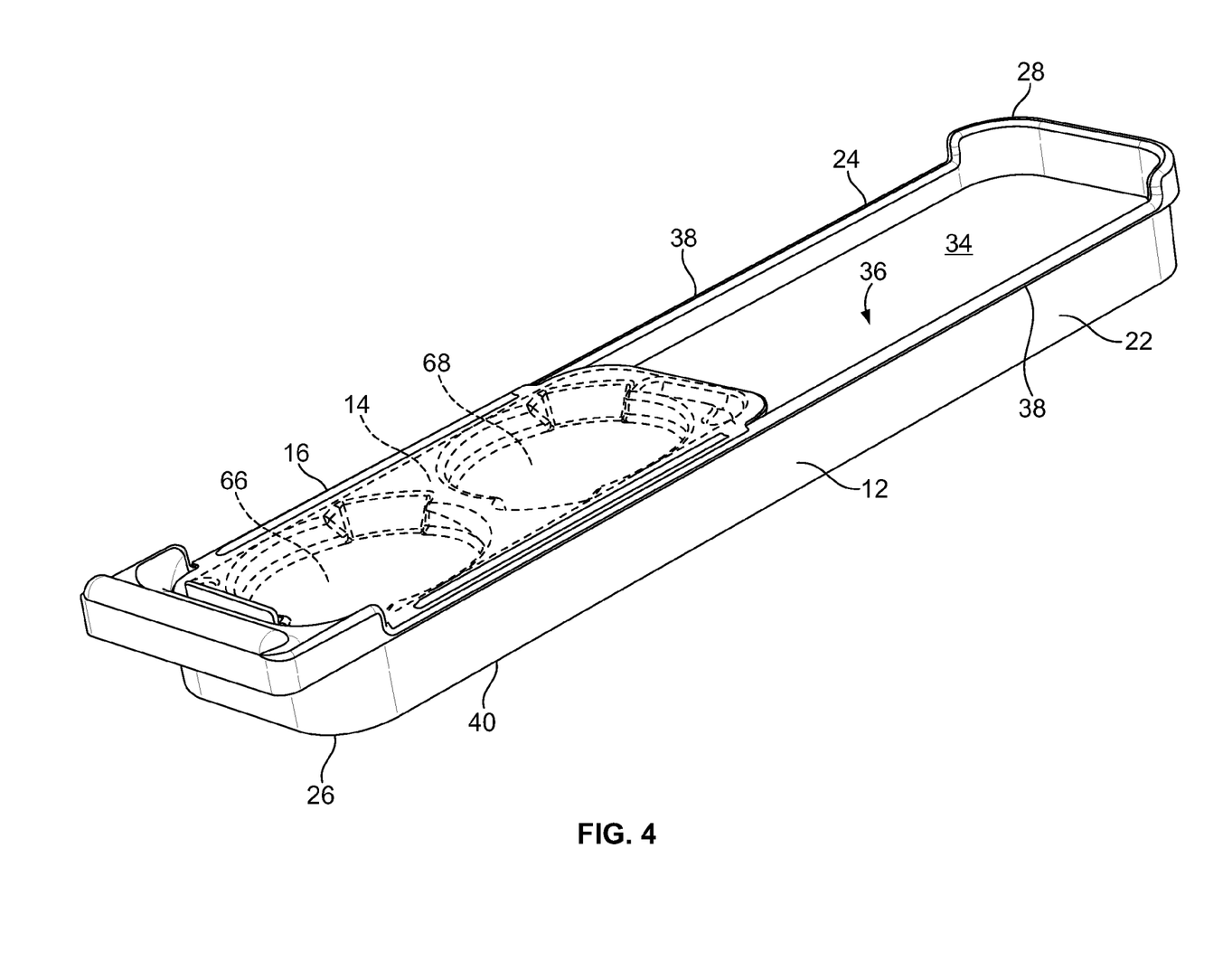
FIG. 4 is a perspective view of the device shown in FIG. 1 and showing food holding compartments in the slide-able tray.

Referring now to FIGS. 4-8, the slide-able tray 14 and the slide-able cover 16 are configured to be able to translate freely between opposite ends 26 and 28 of the elongated tray 12 responsive to pushing and/or pulling the slide-able cover 16 forwardly (toward the first end 26) or backwardly (toward the second end 28) and thereby cover and uncover food holding compartments 66 and 68 in the tray as well as the food holding compartments 30 and 32 in the elongated tray 12. The compartmentalized insert 10 is thus able to "sequentially" open food holding compartments 66, 68, 30, 32, which as shown in FIG. 4, are stacked above each other. By opening the food holding compartments 66, 68, 30, 32, one-by-one, food products held in the compartments can be kept within an encapsulated environment until needed.

In FIG. 4, the slide-able cover 16 is considered to be at a "forward" position, i.e., at the first or front end 26 of the elongated tray 12, and, directly above and covering the slide-able tray 14. Since the slide-able cover 16 and the slide-able tray 14 are both located above the two aforementioned, fixed food holding compartments 30 and 32 in the elongated tray 12, neither of the compartments 30, 32 are visible in FIG. 4.

Figure 5:
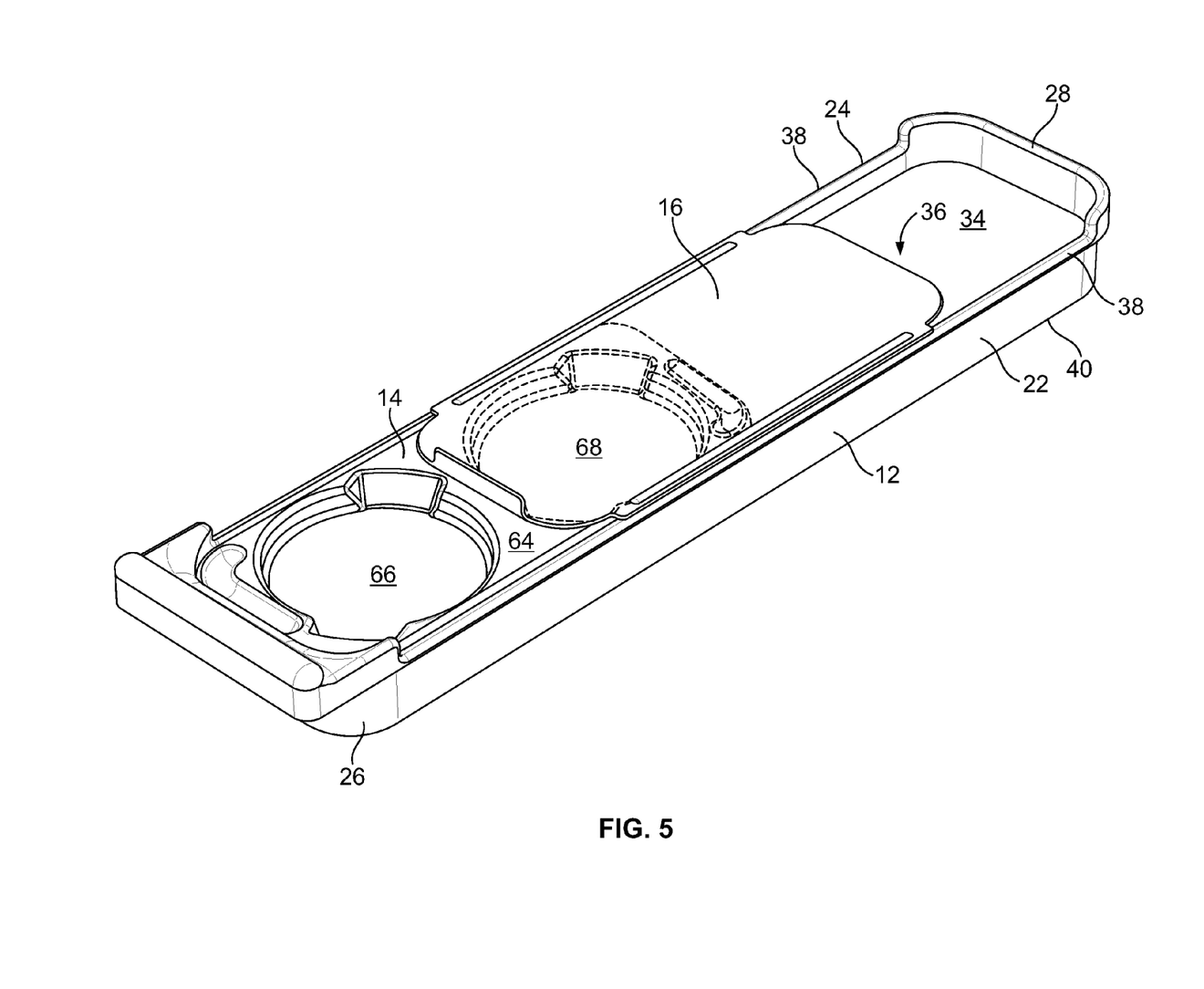
FIG. 5 is a perspective view of the device shown in FIG. 1 with the slide-able cover moved part way back to review one of two food holding compartments in the slide-able tray.
Figure 6:
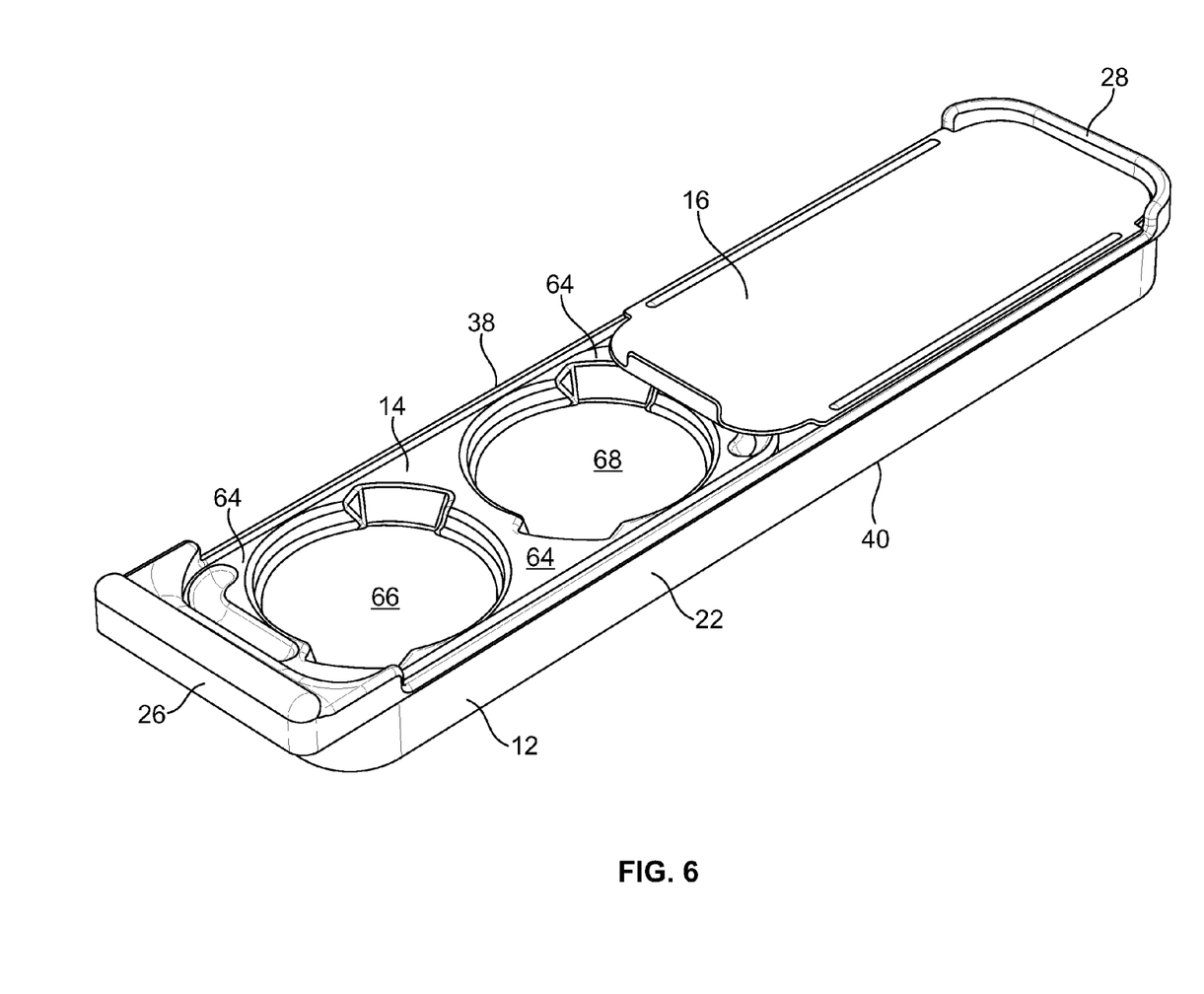
FIG. 6 is a second perspective view of the device shown in FIG. 1 with the slide-able cover moved all the way back to review two of two food holding compartments in the slide-able tray.

FIG. 5 shows the slide-able cover 16 moved back or away from the first end 26 of the elongated tray 12, toward the second or rear end 28 of the elongated tray 12, revealing the forward-located food product holding compartment 66 formed into the top planar surface 64 of the slide-able tray 14. The second food holding compartment 68 of the slide-able tray 14 is shown in broken lines in order to indicate that it is still covered by the slide-able cover 16. FIG. 6 shows the slide-able cover 16 pushed back to and abutting the second end 28 of the elongated tray 12 revealing both food holding compartments 66, 68 in the slide-able tray 14.

In operation, food products kept in the food holding compartments 66 and 68 can be removed from first the two food holding compartments 66 and 68 of the tray 14, one-by-one. Stated another way, a patty in the first compartment 66 can be removed from the first compartment without uncovering a patty in the second compartment 68, simply by sliding the cover 16 half-way toward the second end 38 of the elongated tray 12. A second patty in the second compartment 68 can thus be preserved.

Figure 7:
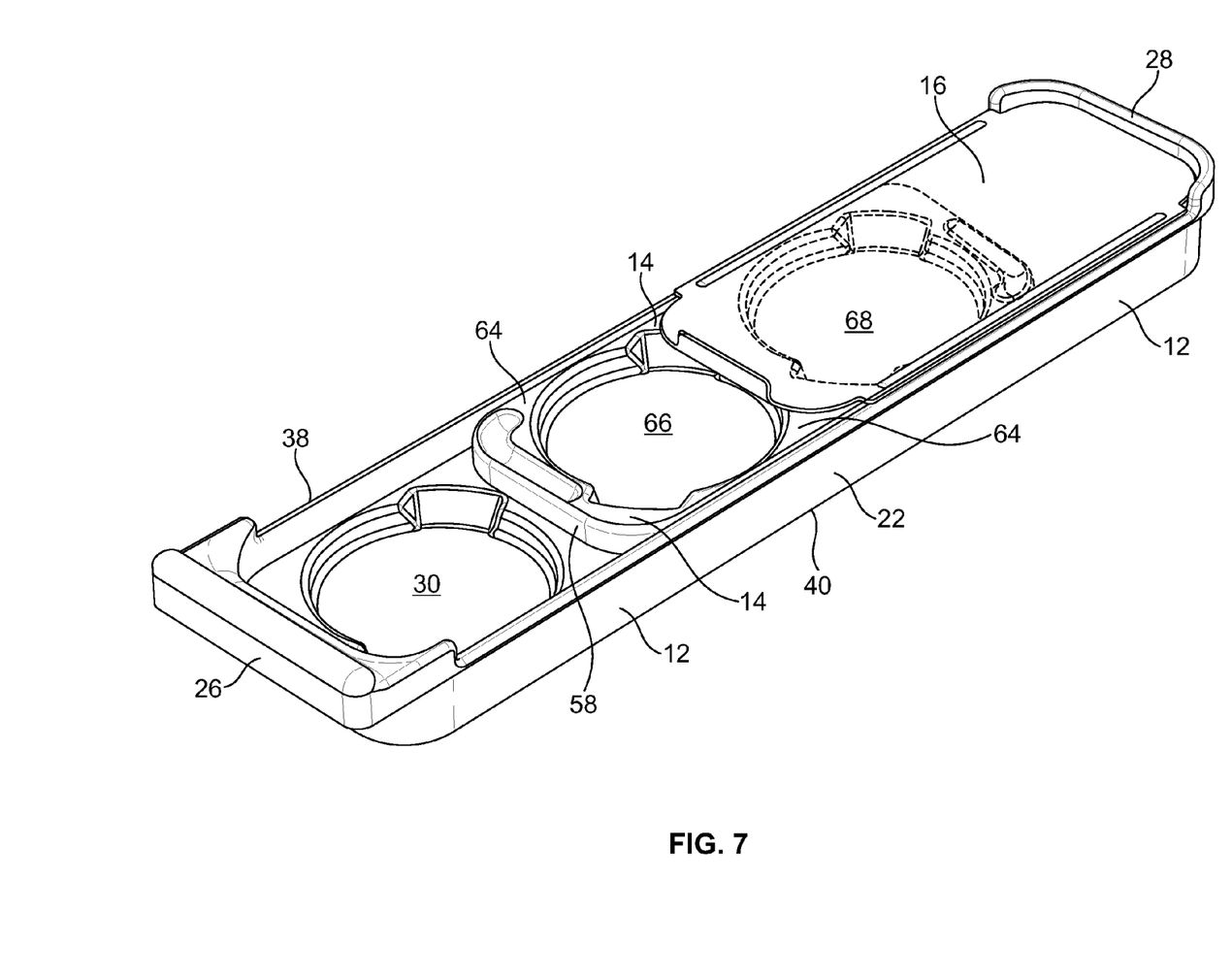
FIG. 7 is a perspective view of the device shown in FIG. 1 with the slide-able cover moved all the way back to the back end of the insert and with the slide-able tray moved part way back to review one of two food holding compartments, which are formed into the elongated tray and fixed.

FIG. 7 shows the slide-able tray 14 moved half-way toward the second end 28 of the tray 12 to reveal the forward-most food holding compartment 30, formed into the elongated tray 12. In FIG. 7, the slide-able cover 16 is moved all the way back toward the second end 28 to reveal the forward-most food holding compartment 66 formed into the slide-able tray 14. Only one of the food holding compartments 30 in the elongated tray 12 is thus uncovered while the other compartment 32 in the elongated tray 12 remains enclosed as an encapsulated environment. Only one compartment 66 in the slide-able tray 14 need be uncovered while the second compartment 68 in the slide-able tray 14 remains covered as an encapsulated environment.

Figure 8:
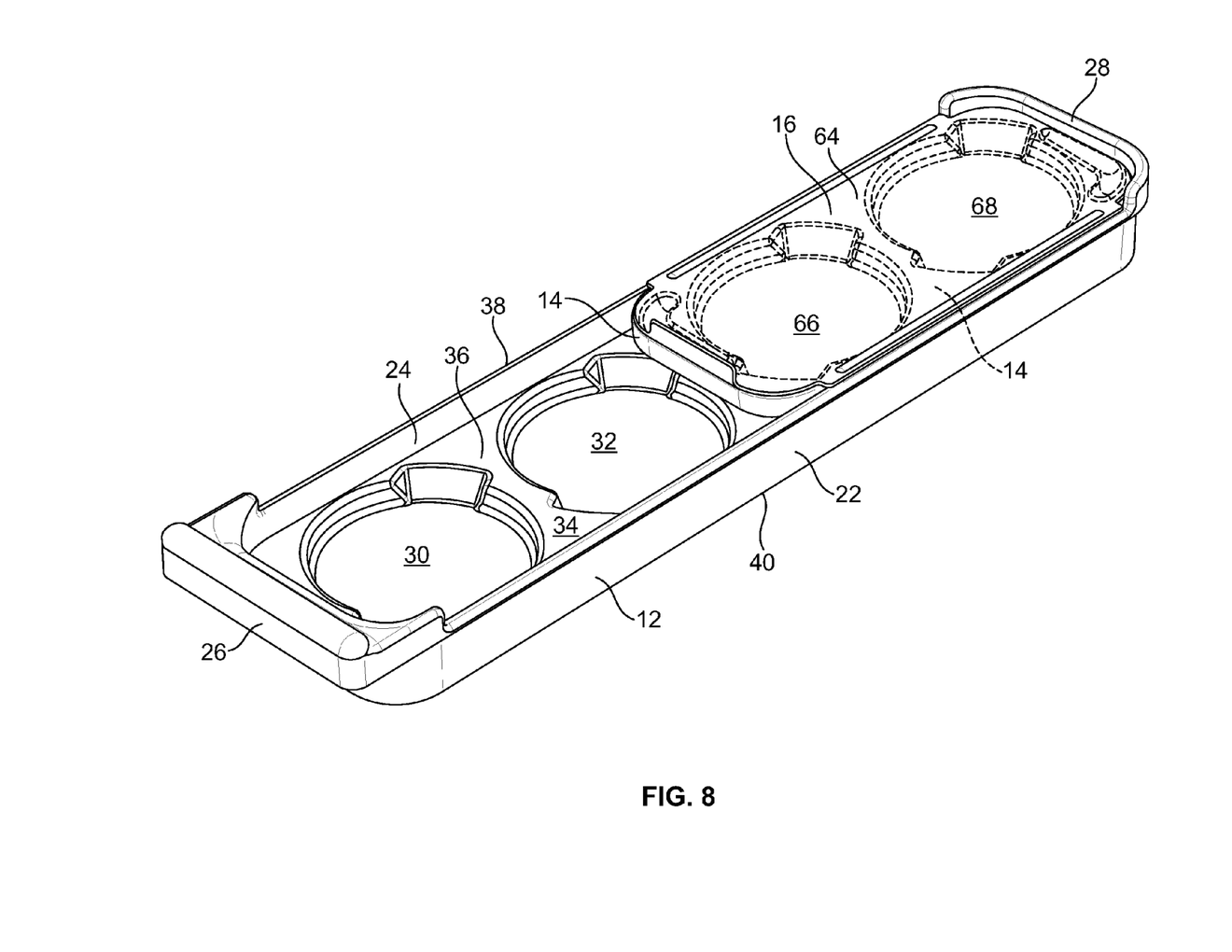
FIG. 8 shows the slide-able cover moved all the way back to the back end of the insert and the slide-able tray moved all the way back to review both of two food holding compartments formed into the elongated tray and fixed.

FIG. 8 shows both the slide-able cover 16 and the slide-able tray 14 pushed all the way back against the second end 28 of the tray 12 to reveal both food holding compartments 30 and 32 formed into the top surface 36 of the platform 34 of the tray 12. Both compartments 66, 68 in the slide-able tray 14 are covered. The compartmentalized insert 10 thus allows the food products kept in the food holding compartments 30, 32, 60, 68, to be selectively removed one-by-one as need arises. Pulling the slide-able cover 16 forward, i.e. toward the first end 26 will also pull the slide-able tray forwardly by the lip 54 that extends downwardly from the top of the slide-able cover 16.

Figure 9:
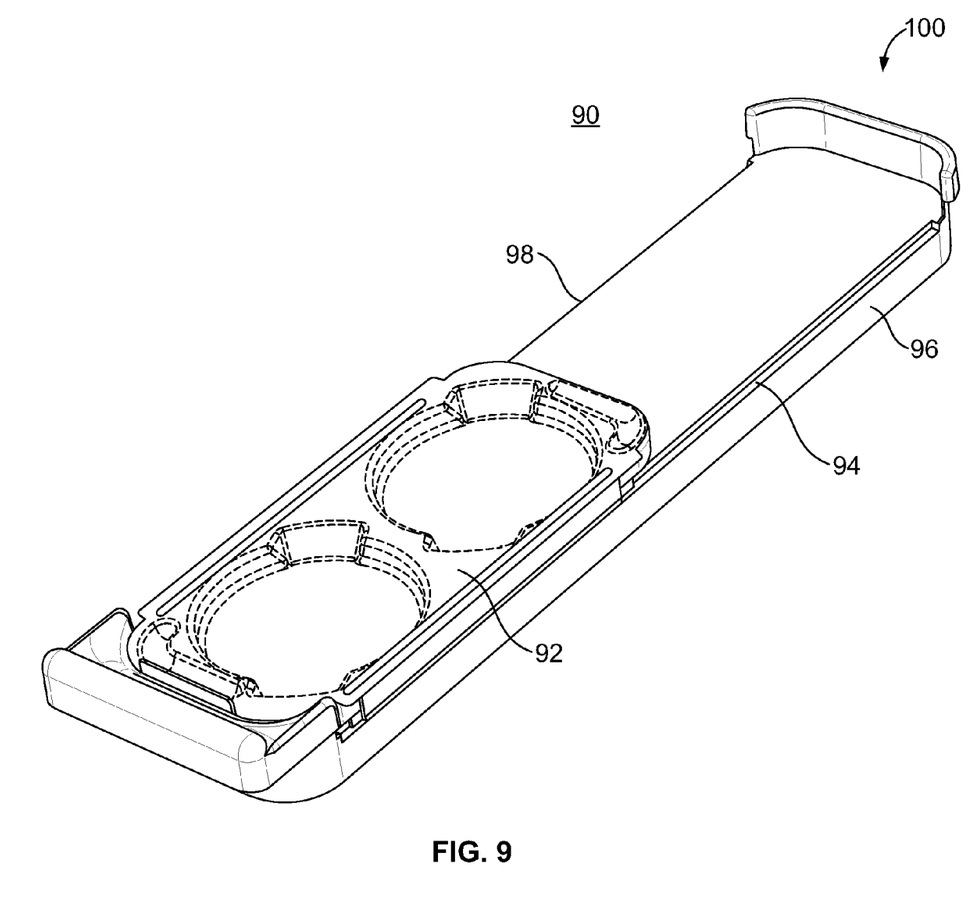
FIG. 9 is a perspective view of a multi-level compartmentalized insert for a food holding cabinet, which has an independently slide-able compartmentalized tray and a cover for the slide-able tray.
Figure 10:
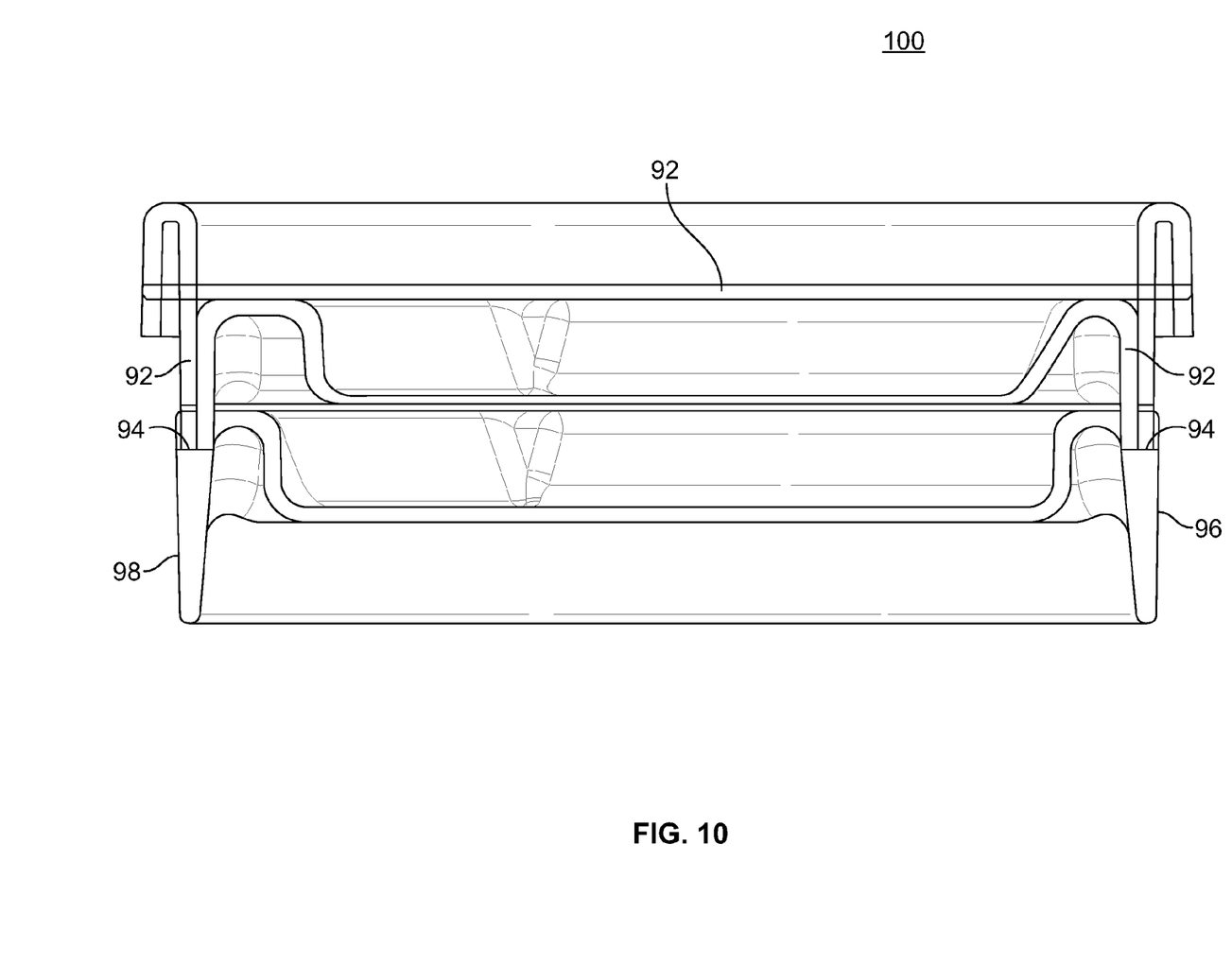
FIG. 10 is a cross-sectional view of the device shown in FIG. 9.

Finally, FIGS. 9 and 10 show an alternate embodiment of an insert 90 having a slide-able tray 92 that rides on the top edge 94 of two elongated and opposing sides 96, 98 of an elongated tray 100. The embodiment shown in FIGS. 9 and 10 is otherwise the same as the embodiment shown in FIGS. 1-8.

The foregoing description is for purposes of illustration. The true scope of the invention is set forth in the following claims.

What is claimed is:

1. A compartmentalized insert for a food holding cabinet comprising:
    an elongated tray comprising first and second opposing sides, first and second opposing ends configured to hold the first and second opposing sides in a fixed, spaced-apart relationship to each other, and at least one food product holding compartment fixedly located in the elongated tray between the first and second opposing sides;
    a slidable tray located in the elongated tray above the first food holding compartment, the slidable tray having at least one food product holding compartment and being configured to freely slide between the first and second opposing ends of the elongated tray;
    a slidable cover disposed above the slidable tray, the slidable cover being configured to slide between the first and second opposing ends of the elongated tray, independent of the slidable tray,
    wherein the slidable tray has a width dimension that is less than a width dimension of the elongated tray.

2. The compartmentalized insert of claim 1, wherein the at least one food holding product of the elongated tray has the same shape as the at least one food holding compartment of the slidable tray.

3. The compartmentalized insert of claim 2, wherein the food holding compartments are disc-shaped depressions.

4. The compartmentalized insert of claim 3, wherein the slidable tray has a length dimension that is less than a length dimension of the elongated tray.

5. The compartmentalized insert of claim 4, wherein the slidable tray has a height dimension that is less than a height dimension of the elongated tray.

6. The compartmentalized insert of claim 1, wherein the slidable cover has a length dimension that is substantially equal to a length dimension of the slidable tray.

7. The compartmentalized insert of claim 6, wherein the slidable cover has a width dimension that is greater than a width dimension of the slidable tray.

8. The compartmentalized insert of claim 1, wherein the slidable cover is transparent or clear.

9. The compartmentalized insert of claim 1, wherein the at least one food holding product of the elongated tray comprises a depression formed in a substantially horizontal surface that extends from the first opposing side to the second opposing side.

10. The compartmentalized insert of claim 1, wherein the slidable cover comprises first and second opposing ends and a downwardly extending lip at one of the first and second ends of the slidable cover.

11. The compartmentalized insert of claim 10, wherein the slidable cover comprises an upwardly extending lip at the other of the first and second ends of the slidable cover.

12. The compartmentalized insert of claim 10, wherein the downwardly extending lip of the slidable cover abuts a first end of the slidable tray when the slidable cover covers the at least one food holding compartment of the slidable tray.

13. The compartmentalized insert of claim 1, wherein the slidable tray has two food holding compartments.

14. The compartmentalized insert of claim 1, wherein the elongated tray has two food holding compartments.

* * * * *